US008632341B2

(12) United States Patent
Calabrese

(10) Patent No.: US 8,632,341 B2
(45) Date of Patent: Jan. 21, 2014

(54) PRODUCTS AND METHODS FOR PROVIDING EDUCATION WITH A VIRTUAL BOOK

(75) Inventor: Luigi-Theo Calabrese, Beverly Hills, CA (US)

(73) Assignee: Disney Enterprises, Inc., Burbank, CA (US)

(*) Notice: Subject to any disclaimer, the term of this patent is extended or adjusted under 35 U.S.C. 154(b) by 1703 days.

(21) Appl. No.: 10/371,489

(22) Filed: Feb. 21, 2003

(65) Prior Publication Data
US 2004/0015360 A1    Jan. 22, 2004

Related U.S. Application Data

(60) Provisional application No. 60/359,194, filed on Feb. 21, 2002.

(51) Int. Cl.
G09B 11/00    (2006.01)

(52) U.S. Cl.
USPC .......................................... 434/169; 434/185

(58) Field of Classification Search
USPC .................... 434/169, 185, 317, 307 R, 319
See application file for complete search history.

(56) References Cited

U.S. PATENT DOCUMENTS

| 4,809,246 | A |   | 2/1989  | Jeng                      |
|-----------|---|---|---------|---------------------------|
| 5,065,345 | A | * | 11/1991 | Knowles et al. ... 715/202 |
| 5,463,725 | A | * | 10/1995 | Henckel et al. ... 715/776 |
| 5,511,980 | A |   | 4/1996  | Wood                      |
| 5,538,430 | A |   | 7/1996  | Smith et al.              |
| 5,697,793 | A | * | 12/1997 | Huffman et al. ... 434/317 |
| 5,739,814 | A |   | 4/1998  | Ohara et al.              |
| 5,741,136 | A |   | 4/1998  | Kirksey et al.            |
| 5,801,713 | A |   | 9/1998  | Endo et al.               |
| 5,810,599 | A | * | 9/1998  | Bishop ... 434/157        |
| 5,820,379 | A | * | 10/1998 | Hall et al. ... 434/178   |
| 5,851,119 | A |   | 12/1998 | Sharpe, III et al.        |
| 5,882,202 | A | * | 3/1999  | Sameth et al. ... 434/157 |
| 5,885,083 | A | * | 3/1999  | Ferrell ... 434/156       |
| 5,897,324 | A |   | 4/1999  | Tan                       |
| 5,899,700 | A |   | 5/1999  | Williams et al.           |
| 5,914,706 | A |   | 6/1999  | Kono                      |
| 5,914,707 | A |   | 6/1999  | Kono                      |
| 6,041,215 | A |   | 3/2000  | Maddrell et al.           |
| 6,164,534 | A |   | 12/2000 | Rathus et al.             |

(Continued)

OTHER PUBLICATIONS

Cedeno, K., Tarzan Collector's Edition DVD Review [online], Apr. 16, 2004 [retrieved on Mar. 15, 2007]. Retrieved from the Internet <URL: http://web.archive.org/web/20040416074347/http://www.uttimatedisney.com/tarzan.html>.*

(Continued)

Primary Examiner — Kathleen Mosser
(74) Attorney, Agent, or Firm — Ference & Associates LLC

(57) ABSTRACT

A product and method for providing a read along educational activity to a user are provided. The product is a single data storage medium containing both book information and associated, coordinated audio narration information. The book information comprises visual images of a book, including pages of a book, moving images of the pages being turned, text on the pages of the book, and pictures or illustrations related to the book or story. The user views the book information on a video screen, as if it were an actual book, while listening to the associated and coordinated audio narration. The product also comprises supplemental features to enhance the read along activity and assist in learning.

18 Claims, 6 Drawing Sheets

(56) References Cited

U.S. PATENT DOCUMENTS

| | | |
|---|---|---|
| 6,190,174 B1 | 2/2001 | Lam |
| 6,192,332 B1 | 2/2001 | Golding |
| 6,195,667 B1 | 2/2001 | Duga et al. |
| 6,229,502 B1 | 5/2001 | Schwab |
| 6,243,093 B1 | 6/2001 | Czerwinski et al. |
| 6,283,764 B2 | 9/2001 | Kajiyama et al. |
| 6,313,828 B1 | 11/2001 | Chombo |
| 6,320,591 B1 | 11/2001 | Griencewic |
| 6,331,867 B1 | 12/2001 | Eberhard et al. |
| 6,370,498 B1 * | 4/2002 | Flores et al. .............. 704/3 |
| 6,442,523 B1 | 8/2002 | Siegel |
| 6,579,100 B1 * | 6/2003 | Clark et al. ............ 434/172 |
| 6,632,094 B1 * | 10/2003 | Falcon et al. ........... 434/178 |
| 6,650,343 B1 * | 11/2003 | Fujita et al. ............ 715/760 |
| 6,915,103 B2 * | 7/2005 | Blume ................... 434/317 |
| 2003/0035075 A1 * | 2/2003 | Butler et al. ........... 348/734 |

OTHER PUBLICATIONS

Wachs, J., Tarzan: DVD Review [online], Mar. 1, 2000 [retrieved on Mar. 15, 2007]. Retrieved from the Internet: <URL: http://web.archive.org/web/20000301032839/www.reel.com/reel.asp?node=dvd/reviews/dvd45603>.*

Hassler-Forest, D., DVD Breakdown [online], May 6, 2001 [retrieved on Mar. 15, 2007]. Retrieved from the Internet: <URL http://web.archive.org/web/20010506161137/http://www.dvdbreakdown.com/titles/tarzan_left.html>.*

* cited by examiner

PRODUCTS AND METHODS FOR PROVIDING EDUCATION WITH A VIRTUAL BOOK

This application claims the benefit of U.S. Provisional Patent Application Ser. No. 60/359,194, filed on Feb. 21, 2002.

BACKGROUND OF THE INVENTION

1. Field of the Invention

This invention relates to new systems and methods for providing education and entertainment to a plurality of user groups. More particularly, the invention relates to systems and methods for delivering multi faceted educational or entertainment material in a single source usable by a plurality of users.

2. General Background and State of the Art

Providing read along education or entertainment typically involves providing a combination of several components. Specifically, a book and a cassette, or other recording medium, are bundled together for the purpose of providing read along education or entertainment to users. A user purchases the combination and uses both components simultaneously to engage in the read along activity.

In a typical read along scenario, the user listens to a narration played from the cassette or other recording medium and, at the same time, looks at the pages of the companion book. Specifically, the user can read the words in the book while simultaneously hearing the audio narration from the cassette. Of course, the user can also choose to look at pictures in the book, that correspond to the words and the audio narration, instead of actually reading to words. As the narration proceeds, the user turns the pages of the book, such that the text he sees in the book is consistent with the ongoing narration being played back from the cassette. In this manner, he proceeds through a story, reading the text while hearing the coordinated narration of the story, and turning the pages as the story proceeds. Of course, one problem with the method is that the user may alter the timing of the read along scenario by turning the pages at incorrect times in relation to the audio narration. There is no connection between the book and the audio narration to ensure that the user maintains synchronization between them.

There are several problems with such prior art systems and methods for providing read along education and entertainment. One problem involves the difference in the type of products that are packaged together to provide a read along product. A book is very different, in size, shape and form, from a cassette, CD-Rom, or other recording medium. Not only can the different products be difficult to package together, they are cumbersome for a user to maintain as a combination. For example, if both components are not kept together, or if one component becomes lost or unavailable, the read along activity cannot be performed by the user with the remaining component.

These types of prior art also involve manual synchronization of the audio narration with the text. Turning of each page must also be performed manually. For young children who do not yet recognize when the page should be turned, this is a disadvantage.

Another problem with current read along products is difficulty with providing such products in multiple languages. The ability to provide read along products in multiple languages appeals to larger numbers of users who may be able to engage in the read along activity only in certain ones of those languages. However, producing multi-language products is a very cumbersome and expensive process. It requires a separate book and recording medium for each language. Therefore, a consistent product cannot be produced and marketed to areas of different languages; rather, multiple products must be produced and marketed to effectively provide the read along activities to people of those different languages.

SUMMARY OF THE INVENTION

The present invention therefore provides a single-component product that offers read along activities suitable for a variety of users. The single component product offers the read along activities in a plurality of different languages, providing for users who speak many different languages as well as those who may desire to learn a foreign language.

More specifically, the present invention comprises book information and coordinated audio narration on a single storage medium, with the book information and audio narration easily accessible and viewable in a plurality of languages.

Book information, as used herein, embraces textual information in the form of written or printed Words normally found within the pages of a book, as well as related visual and physical data. For example, book information includes the physical appearance of a book, such as the physical appearance of pages of a book and the physical appearance of the turning of pages of a book. Book information provides simulation of a conventional book and does not merely replace conventional books. That is, book information includes images of the physical appearance of a conventional book, which may be bound and have a plurality of pages that may be turned forward and backward to reveal the story therein. Book information, then, allows the presentation of a conventional book, normally a three-dimensional experience for a reader, on a planar viewing screen. The presentation includes images of pages of a book interspersed with imagery of pages being changed, such as by turning the pages or fading in and out from one page to the next. Therefore, book information allows for a realistic presentation of a conventional book, and does not involve the mere scrolling of images or "pages" on a video screen. Rather, the presentation of book information on a video screen is considered, in the present invention, the equivalent of the physical turning of pages in a conventional book.

In one embodiment of the invention, a recording medium stores a plurality of sequences of book information and a plurality of sequences of audio narration. The audio narration is coordinated or synchronized with the book information. Each of the plurality of sequences of book information is of a different language. Similarly, each of the plurality of sequences of audio narration is of a different language. The correlation between the audio narration and the book information is consistent, regardless of the language. That is, a sequence of audio narration in a first language is correlated to a sequence of book information in a second language. More generally, a sequence of audio narration in a first language is correlated to any sequence of book information in the first language or any other language.

Therefore, in this particular embodiment of the present invention, a single product can be used as a more traditional read-along activity, where text in the user's language is presented in a synchronized fashion with the audio narration of the same language. The same single product can also be used to learn different languages, either by choosing to view the text in the user's native language while listening to audio narration in a second language, or vice versa.

The recordable medium may preferably be a digital video disc, or DVD. The DVD can be easily played at home using a DVD player connected to a television. Also, the DVD may played on a computer, such as a desktop computer or laptop computer, with a DVD drive in it.

In another embodiment of the invention, a single product contains a plurality of sequences of book information and a plurality of coordinated narration sequences. The single product may also include, for example other activities to supplement the read along activity supported by the plurality of book information sequences and the plurality of coordinated narration sequences. The other activities may include, for example, sing along songs, music videos, vocabulary lessons and Web searching activities.

In another embodiment of the invention, a single product contains a plurality of book information sequences and a plurality of coordinated narration sequences, wherein the plurality of book sequences includes subtitle information. The subtitle information may be, although is not necessarily, in a language different than the language of the coordinated narration sequences. Similarly, the subtitle information may be, although is not necessarily, in a language different than the language of the sequences of book information.

In another embodiment of the invention, a single product contains a film, such as a movie, and a plurality of book information sequences. The book information sequences are coordinated to the progression and playback of the film.

In yet another embodiment of the invention, a single product contains audio music sequences and a plurality of book sequences that include lyrics according to the audio music sequences. Users of the product view the lyrics in coordination with hearing the audio music sequences.

Another embodiment of the invention comprises a single product having book information, related and coordinated audio narration, and an additional feature allowing users to access Websites on the World Wide Web. The Website navigation supplements the user's read along experience.

Another embodiment of the invention comprises a single product having book information, related and coordinated audio narration, and an additional feature for providing a vocabulary lesson to a user. The additional feature comprises visual images associated to vocabulary words, the visual images and vocabulary words associated with the book information and the related and coordinated audio narration. The vocabulary words are presented in any of a plurality of languages, as selected by the user.

In yet another embodiment of the present invention, the read along activity need not be a direct simulation of reading a book, but may comprise other visual information presented with text and synchronized audio narration. The visual information may, for example, be animation, images, illustrations, or other graphics that are viewed along with the text, illustrating the story. For example, popular movies, television shows or may offer a read along activity in accordance with the present invention. A popular animated film, for example may employ illustrations from the movie which help tell the story. Similarly, animation can also be used along with the text.

The present invention offers many advantages over prior art methods. As mentioned above, a primary benefit of the present invention over prior art is that it is offered in a single product. Also, DVDs are small, compact and are easily transported. Furthermore, since DVD's have become quite common, in most cases does not require the purchase of special equipment to operate. The present invention is also a multi-faceted learning tool. It not only offers reading tools, but foreign language learning tools as well.

The foregoing and other objects, features, and advantages of the present invention will be become apparent from a reading of the following detailed description of exemplary embodiments thereof, which illustrate the features and advantages of the invention in conjunction with references to the accompanying drawing Figures.

DETAILED DESCRIPTION OF THE INVENTION

In the following description of the preferred embodiments reference is made to the accompanying drawings which form a part thereof, and in which are shown by way of illustration specific embodiments in which the invention may be practiced. It is to be understood that other embodiments may be utilized and structural and functional changes may be made without departing from the scope of the present invention.

Figure 1:
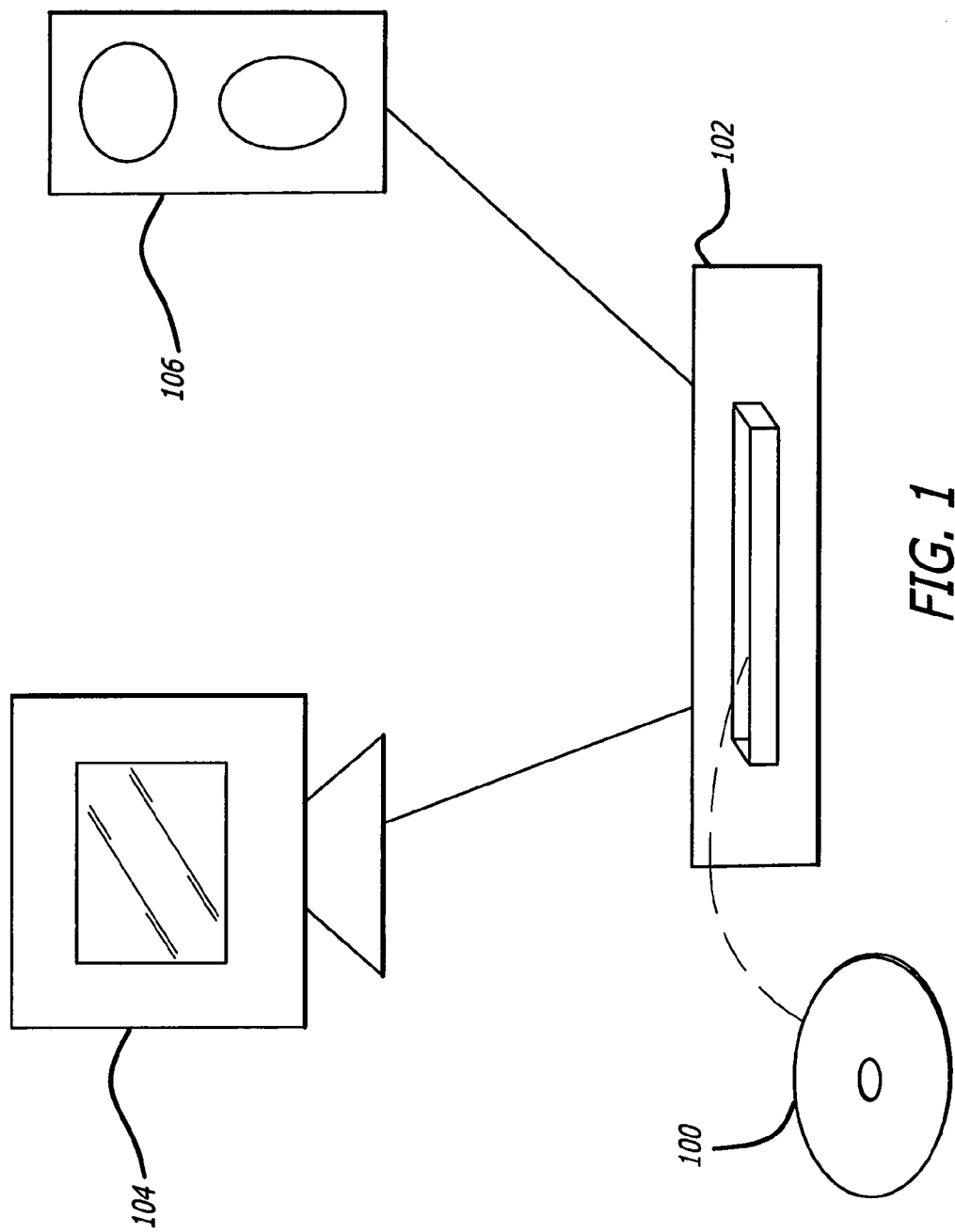
FIG. 1 illustrates an exemplary system that may be used in one embodiment of the present invention.

FIG. 1 illustrates an exemplary system that may be used in an embodiment of the invention. A single product, such as a digital storage medium 100, contains book information and associated, coordinated audio narration. A user accesses the book information and the audio narration by "playing" storage medium 100 on a playback device such as disc player 102. The book information is thereby viewable to the user on a display screen 104, and the audio narration is audible to the user through speakers 106.

Storage medium 100 may be, for example, a digital video disc (DVD), and disc player 102 may be a DVD player. DVDs are an enhanced form of CD Rom that hold a minimum of 4.7 gigabytes (GB). DVD specification supports disks with capacities from 4.7 GB to 17 GB and access rates of 600 KBps to 1.3 MBps. Typically, DVD technology uses MPEG-2 to compress video data for storage. In the exemplary embodiments described herein, book information, audio narration, and other supplemental or additional features may be stored and retrieved from a single DVD. DVD player 102 may be a stand-alone DVD player unit or, alternatively, a DVD drive in a desktop or laptop computer. Video screen 104 may be a television connected to the DVD player or a computer monitor, for example.

FIGS. 2-6 comprise a plurality of screen shots from an exemplary DVD embodiment of the present invention. A plurality of DVD embodiments of the present invention may include book information, audio narration sequences, and supplemental activities, or alternative combinations thereof.

Figure 2:
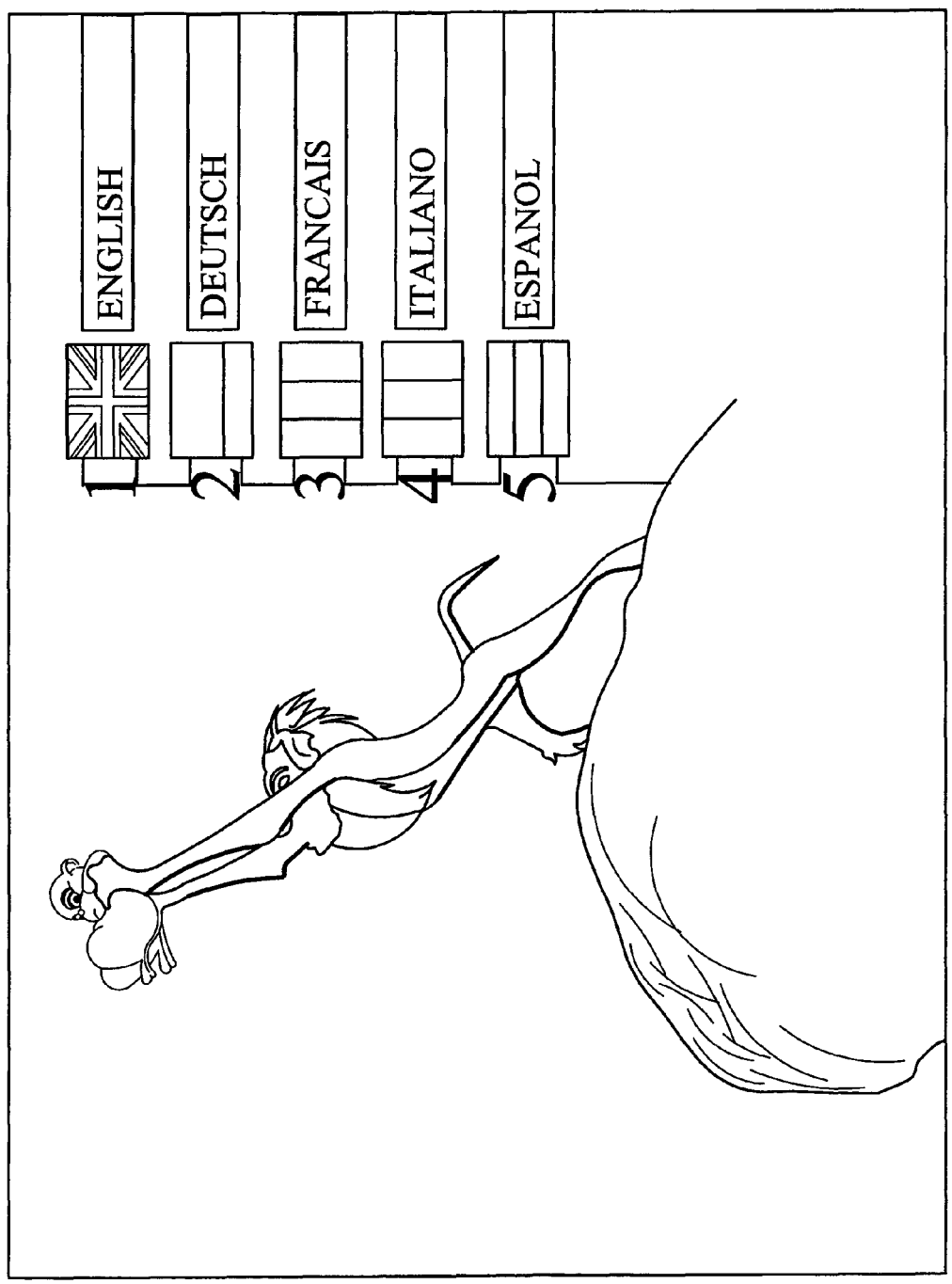
FIG. 2 illustrates an exemplary language menu screen displayed in one embodiment of the present invention.

As illustrated in FIG. 2, the exemplary DVD presents on a video screen a language menu to a user who plays the DVD. The language menu enables the user to select, from among a plurality of available languages, which language he wishes to proceed with his read along experience. The languages include, but are not limited to, English, German, French, Italian and Spanish. Once a language is selected, the DVD presentation continues in the selected language. During the remainder of the presentation and read along experience, the selected language may be changed by the user, such as by accessing a drop down or pop-up on-screen language menu. Such a menu would also allow the user to select a language to proceed in. At any given time, the presentation proceeds in the current selected language both in the visual text and the audio narration. Also, the language of the visual text and the language of the audio narration may be different from one another. This enables the user to associate a first language with a second, thereby enhancing his experience and facilitating his learning and understanding of the languages.

Figure 3:
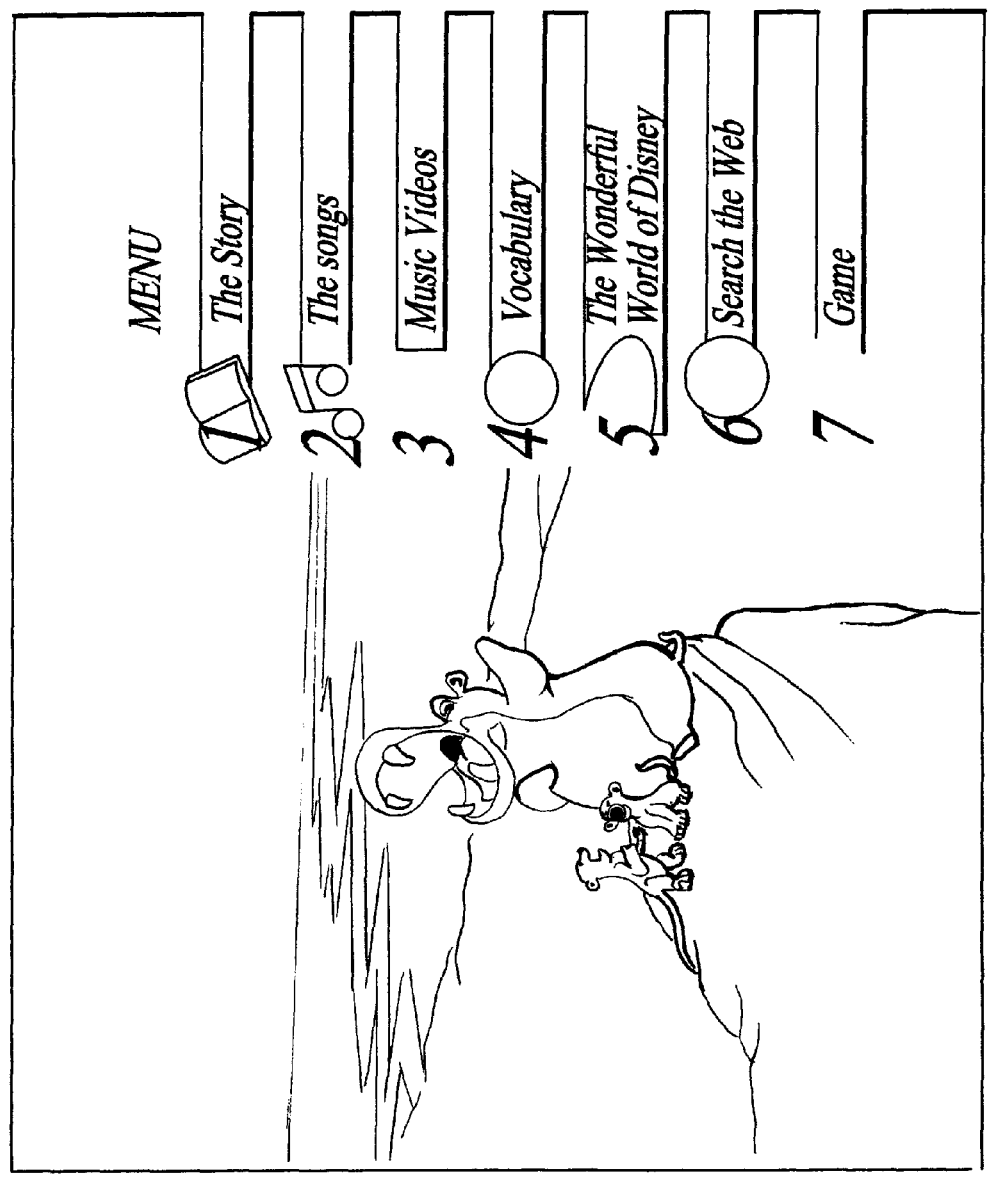
FIG. 3 illustrates an exemplary product features menu screen in one embodiment of the present invention.

After the language is selected, in an exemplary embodiment, a second menu is presented to the user. An exemplary second menu is illustrated in FIG. 3. This menu, presented in the currently selected language, makes a plurality of options available to the user for what activity they would like to perform. The options include, for example, a read along activity, a sing along activity, music videos for viewing, a vocabulary building activity, informational content delivery, a Web-searching activity and a language selection feature, the selection of which directs the user to the language menu described above.

The read along activity is shown as item 1 of FIG. 3, entitled "The Story." When the user selects this menu item, he is presented with visual and audio sequences on the DVD to engage him in the read along activity. The visual sequences include, for example, book information such as text of a story, visual images of a book cover, visual images of pages within the book having the story text printed thereon, visual images of pictures appearing on pages of the book, and the like. The visual sequences further include, for example, moving images such as pages being turned within the book. Therefore, as the user views the presentation of the read along activity, it is as though he is viewing pages of a book. He can interact with the book that appears on a screen, such as a computer screen or a television connected to a DVD player, such as by "opening" the book or "turning a page" within a book. Without having an actual book, then, the user is able to manipulate a virtual book on a video screen. He can read the words within the book, in synchronization with the audio narration that is part of the read along activity. Alternatively, the user can turn off the audio narration, and simply read the text of the book information, turning pages as he proceeds through the story, without simultaneously hearing the audio narration. In this way, the user can practice his reading skills without the assistance of the coordinated narration.

Figure 4:
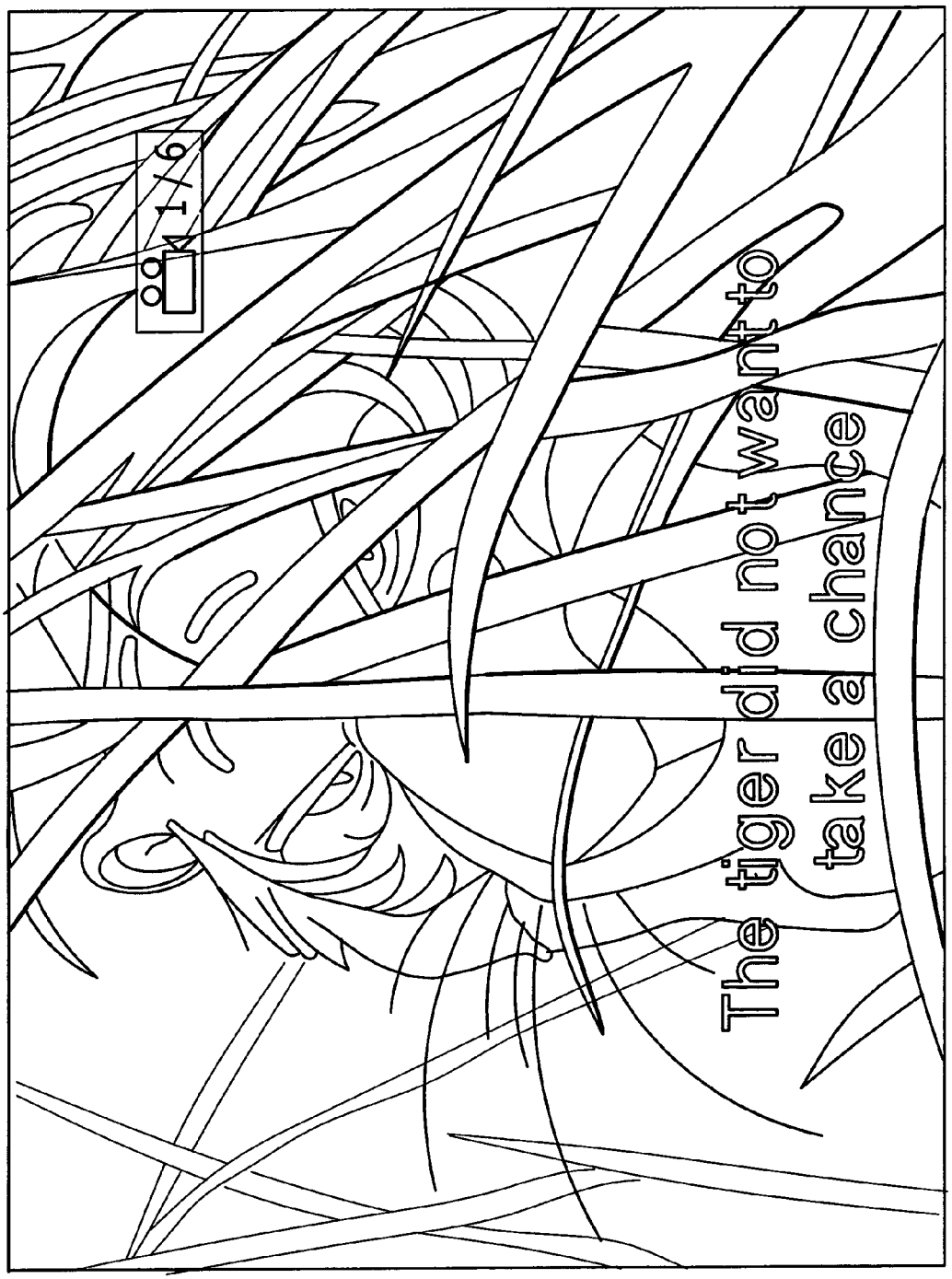
FIG. 4 illustrates an exemplary read along activity screen in one embodiment of the present invention.
Figure 5:
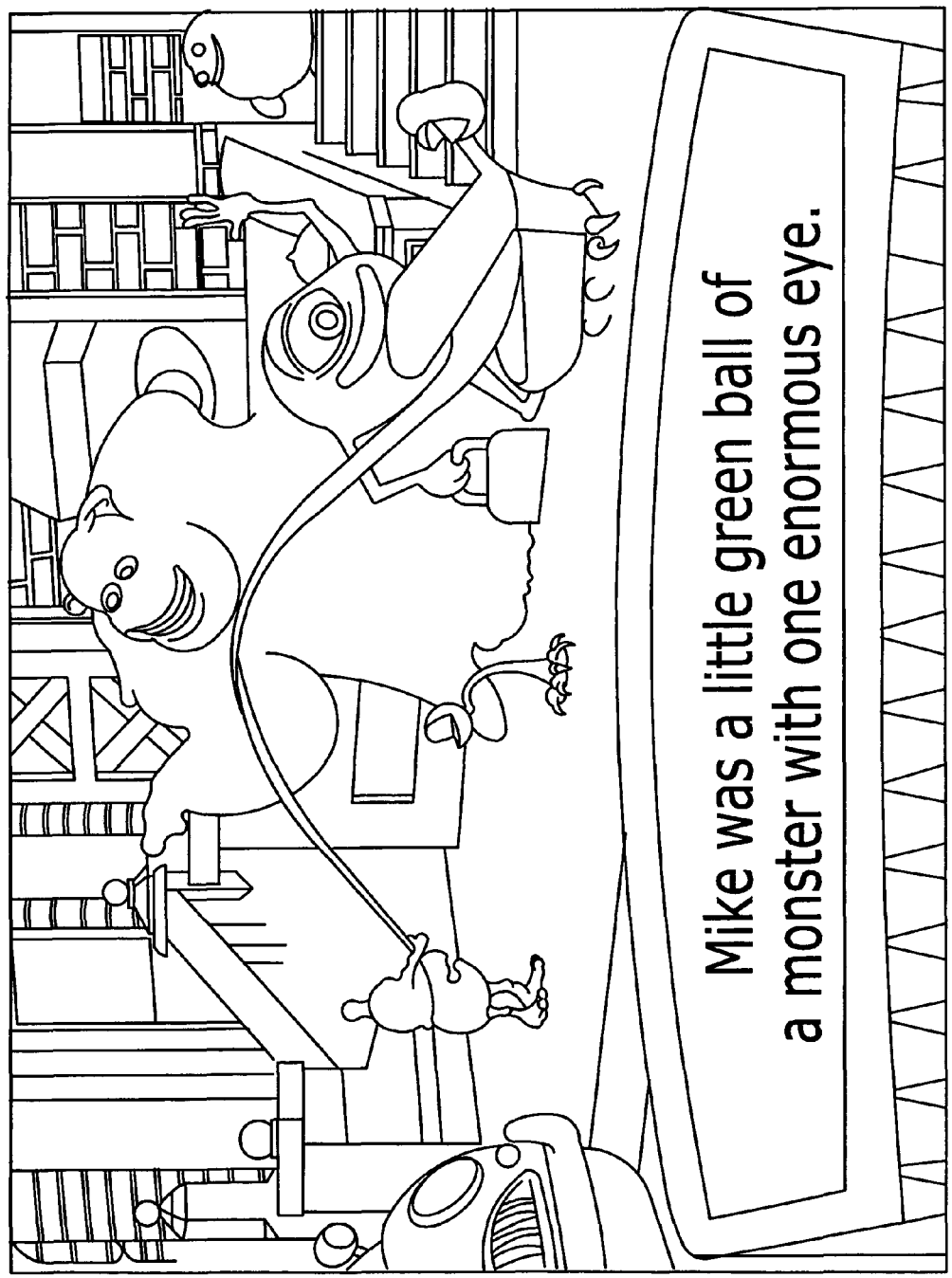
FIG. 5 illustrates an exemplary read along activity screen in one embodiment of the present invention.

An exemplary embodiment of a screen from the read along activity, or "The Story" is illustrated in FIGS. 4 and 5. In this particular embodiment, visual information such as still images, motion pictures, animation are used to illustrate the story. The visual information is shown along with the text of the story, or may be shown in the background. Of course, audio narration is presented in coordination with the text as it appears on the screen. This however, can not be shown in the Figure.

The read along activity is enhanced by the ability to choose multiple languages to engage in the activity with. The multiple languages are applicable to either the text that appears on the pages of the on-screen book; and the multiple languages are applicable to the audio narration. Also, the text language and the narration language need not be the same. For example, a user can choose to engage in the read along activity such that he views the text of the book in a first language while he hears the coordinated audio narration in a second language. Such a variation on the read along activity assists the user in learning different languages, for he can perceive the story in a language he is fluent in while he simultaneously perceives the story in a language he is attempting to learn, thereby associating words of the second language with the familiar fluent language. The language of either the book information or the coordinated audio narration can be changed by the user at any time during the read along activity, such as by accessing a language selection menu.

In another embodiment of the present invention, the read along activity need not be a direct simulation of reading a book, but may comprise other visual information presented with text and synchronized audio narration. The visual information may, for example, be animation, images, illustrations, or other graphics that are viewed along with the text, illustrating the story. For example, popular movies, television shows or may offer a read along activity in accordance with the present invention. A popular animated film, for example may employ illustrations from the movie which help tell the story. Similarly, animation can also be used along with the text.

The sing along activity is illustrated as item 2 of FIG. 3, entitled "The Songs." When the user selects this menu item, he is presented with visual and audio sequences on the DVD to engage him in the sing along activity. The audio sequences include musical tunes and may also include lyrics. If lyrics are included, they will be in a language selected by the user. The visual sequences include written lyrics that the user can view and use as a guide to sing along with the musical tunes. The written lyrics, which appear on the video screen, are presented in a language selected by the user. The sing along activity allows the user to practice language skills by reading words on the screen (the lyrics) and singing them vocally to accompany the musical tune. The visual sequences may also include, for example, pictures or moving pictures to accompany the songs, and may specifically include moving images of pages of a book turning, such as to reveal continuing lyrics on a next page within a book. The sing along activity may include a plurality of songs. The words that appear on the screen, in an exemplary feature of this embodiment, may be highlighted at the same time that they are heard in the accompanying audio narration. This allows the user to visually identify each word, via the on-screen highlighting, at the same time he hears it being pronounced in the audio narration.

The music videos selection is item 3 of FIG. 3, entitled "Music Videos." When the user selects this menu item, he is presented with visual and audio sequences on the DVD to present to him music videos. Stored on the same data storage medium as the read along and sing along activities, the music videos are supplemental material which enhance the educational product for the user. The music videos are an example of entertainment material that can be stored within the same single product as the read along activity to provide users with a plurality of educational and entertainment experiences within a single product. As with the other activities and features described herein, the music videos may be portrayed in any of a plurality of languages, as selected by the user.

The vocabulary building activity is item 4 of FIG. 3, entitled "Vocabulary." When the user selects this menu item, he is presented with visual and audio sequences on the DVD to engage him in the vocabulary teaching and building activity. The visual sequences include words that are written on the video screen in any of a plurality of languages, as selected by the user.

Figure 6:
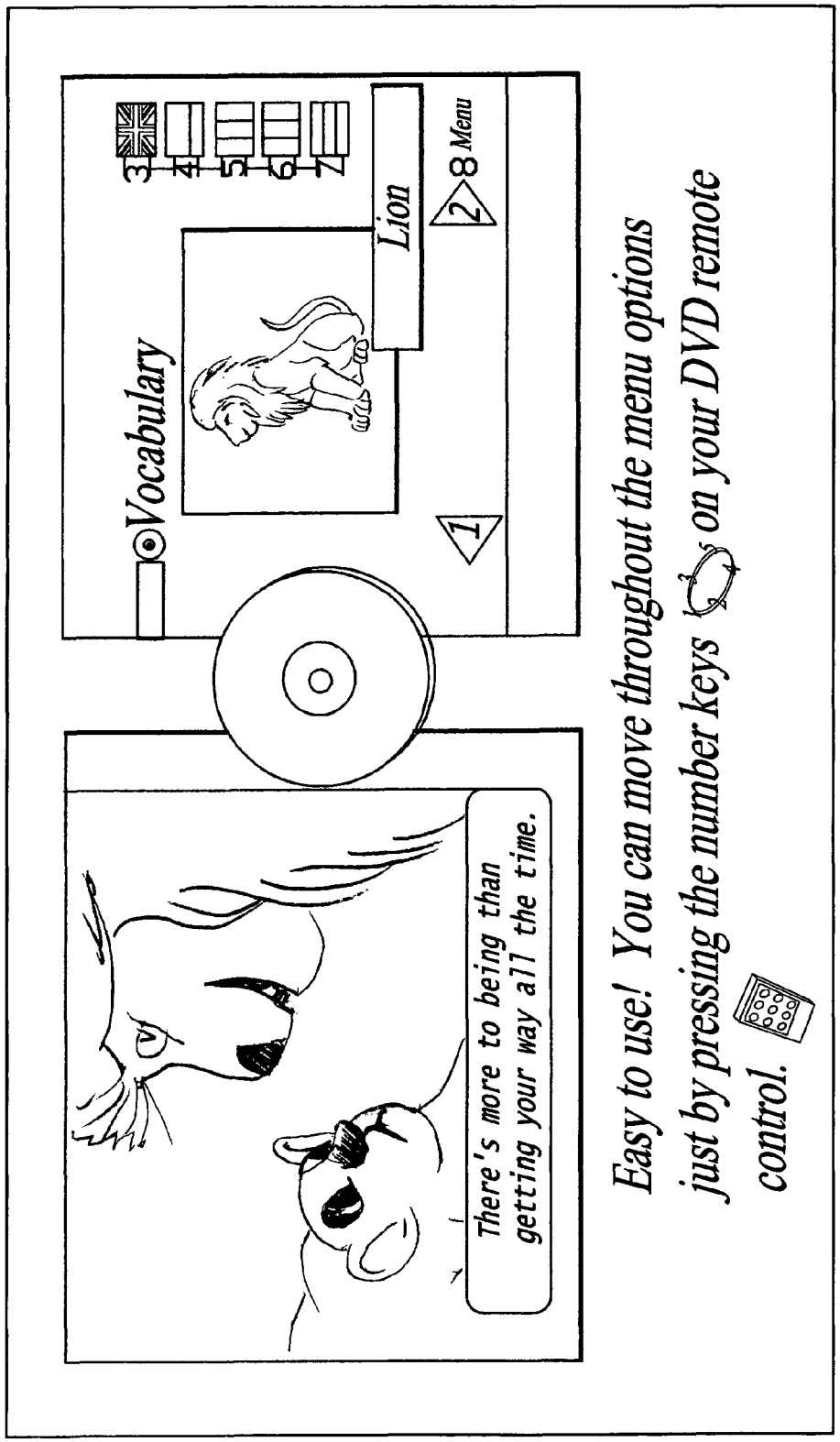
FIG. 6 illustrates an exemplary vocabulary building activity screen one embodiment of the present invention.

In an exemplary embodiment of the vocabulary building feature, illustrated in FIG. 6, the word appears on the video screen with no accompanying audio sequence. This is illustrated, for example, on the right side of FIG. 6, where the word "Lion" appears in a text box. After a short period of time of silence, in the range of several seconds, an audio sequence plays and is heard by the user. The audio sequence is a verbal annunciation of the word that appears on the video screen.

The audio sequence may be of the same or a different language than the word as it appears on the video screen. The short period of silence affords the user an opportunity to attempt pronouncing the word as he views it on the screen. Because he has the ability to select different languages, the user may attempt to pronounce words in a language he is not familiar with. After his attempt, at the expiration of the short period of silence, he then hears the proper pronunciation of the word in the audio sequence. In this manner, the user may learn to pronounce a plurality of words in any of a plurality of different languages. In the exemplary embodiment, the user may select a language by selecting a flag representing that language. In FIG. 6, along the right hand side of the screen, Flag 3 is the British flag and represents English. Therefore, if the user selects Flag 3, such as by clicking on it with a computer mouse or selecting it with a DVD remote control, he chooses to proceed with the vocabulary building activity in the English language. Similarly, other national flags are shown and listed to represent their native languages and may be selected by the user to select those languages for the language building activity.

The vocabulary building activity may also include, for example, pictures and images that are associated with the words that appear visually on the video screen and are heard in the audio sequences. The association of the picture or image with the visual image of the word and the audio pronunciation of the word further assist the user in learning the meaning of the word in any of the selected languages. For example, if the user is engaging in the vocabulary building activity in the English language, and the word is "lion," he will (a) see the word "lion" appearing on the video screen; (b) see a picture or an image of a lion also appearing on the video screen; and (c) after the period of silence during which he may attempt to pronounce the word "lion," hear the pronunciation of the word "lion" in the selected English language. Of course, any word or combination of words is contemplated as being within the scope of this feature, and any language may also be used.

The informational content delivery is item 5 of FIG. 3, entitled "THE WONDERFUL WORLD OF DISNEY." When the user selects this menu item, he is presented with visual and audio sequences on the DVD to engage him in the content delivery activity and presentation. The visual and audio sequences may include a variety of informational sequences for presentation to a user. For example, educational materials may be conveyed to the user, or information about a company, such as the company who produces the DVD and its content, may be conveyed to the user. A wide array of content is contemplated as being within the scope of this feature, which enhances the DVD read along product with supplemental content of an informational, educational or entertainment nature.

The Web-searching activity is item 6 of FIG. 3, entitled "Search the Web." When the user selects this menu item, he is presented with visual and audio sequences on the DVD to engage him in the Web-searching activity. This is yet another example of supplemental content that may be stored on the same data storage medium as the read along activity for enhancing the user's experience. When the DVD is situated in the DVD player such that its data can be accessed and read thereon, a plurality of links to Web sites appears on the video screen. The links are embedded Web site addresses that may be selected by the user. Upon selection of a link, the user is then directed to the Web site located at the address embedded therein. The Web searching activity thereby provides the user with directed access to various Web sites on the World Wide Web, via the Internet, to enhance the read along activity and product. The provision of links is controlled by the producer of the DVD read along product, so that the Web sites associated with the links may be, for example, associated with the producer or associated with the subject matter of the read along activity. For example, the user may be able to visit Web sites that provide further information about the DVD product producer, further information about the story of the read along activity, or other additional information.

The foregoing description of the preferred embodiments of the invention has been presented for the purposes of illustration and description. It is not intended to be exhaustive or to limit the invention to the precise form disclosed. Many modifications and variations are possible in light of the above teaching. For example, the various activities and supplemental features described herein may be stored and provided to users on storage media other than DVDs. The read along activity and product may also be supplemented by features and supplemental content other than those described herein. It is intended that the scope of the invention be limited not by this detailed description, but rather by the claims appended hereto.

What is claimed is:

1. A non-transitory computer readable medium capable of providing a read along activity to a user, the non-transitory computer readable medium executable on a playback device to perform the following steps:
    presenting a language menu system for selecting a language from a plurality of languages in which to present the read along activity;
    presenting an activity menu system for selecting from a plurality of read along activities;
    presenting book information, the book information comprising at least text in the language selected and images of pages within a book and moving images of the pages turning within the book;
    presenting audio narration, the audio narration being coordinated with the presentation of book information and synchronized with the moving image of the page turning such that the user may hear the audio narration while reading the text and wherein the user controls the moving image of the page turning; and
    presenting a visual and audio vocabulary lesson upon receiving a selection corresponding to the vocabulary lesson on the activity menu system, the vocabulary lesson comprising:
        displaying at least one visual story image and at least one sentence;
        presenting one or more vocabulary words corresponding to one or more of: the at least one story image and the at least one sentence;
        displaying one or more vocabulary word images visually representing the one or more vocabulary words;
        presenting a vocabulary lesson language menu comprising a plurality of language selections for pronunciation of the one or more vocabulary words; and
        after a predetermined period of silence, pronouncing the one or more vocabulary words in a selected language.

2. The computer readable medium of claim 1, wherein the computer readable medium is a digital video disc (DVD) and the playback device is a DVD player.

3. The computer readable medium of claim 1, wherein the computer readable medium is a digital video disc (DVD) and the playback device is a computer with a DVD drive.

4. The computer readable medium of claim 1, wherein the language of the audio narration is the same as the language of the book information.

5. The computer readable medium of claim 1, wherein the book information is presented in a first language and the audio narration is presented in a second language.

6. The computer readable medium of claim 1, wherein the plurality of read along activities comprises at least sing-along songs, music videos, vocabulary lessons, and web searching activities.

7. A method for providing a read along activity to a user, the method comprising:
   presenting book information derived from a computer readable medium on a display associated with an electronic device, wherein the book information comprises text of a story and visual data simulating the appearance of a book and the appearance of the pages of the book turning;
   presenting audio narration, the audio narration being selectable in a plurality of languages and synchronous with the book information and with the pages of the book turning, wherein the presenting of audio narration is in a first language and can be changed to a second language by input from a user and wherein the user controls the moving image of the page turning; and
   presenting a visual and audio vocabulary lesson upon receiving a selection corresponding to the vocabulary lesson on an activity menu system, the vocabulary lesson comprising:
      displaying at least one visual story image and at least one sentence;
      presenting one or more vocabulary words corresponding to one or more of: the at least one story image and the at least one sentence;
      displaying one or more vocabulary word images visually representing the one or more vocabulary words;
      presenting a vocabulary lesson language menu comprising a plurality of language selections for pronunciation of the one or more vocabulary words; and
      after a predetermined period of silence, pronouncing the one or more vocabulary words in a selected language.

8. A non-transitory computer readable medium executable by a playback device to perform:
   presenting a language menu system for selecting a language from a plurality of languages;
   presenting an activity menu system containing selections comprising: a story and a vocabulary lesson;
   responsive to selection of the story, presenting the story as a read along activity in one or more of the plurality of languages; and
   responsive to selection of the vocabulary lesson:
      presenting the vocabulary lesson in one or more of the plurality of languages;
      displaying at least one visual story image and at least one sentence;
      presenting one or more vocabulary words corresponding to one or more of: the at least one story image and the at least one sentence;
      displaying one or more vocabulary word images visually representing the one or more vocabulary words;
      presenting a vocabulary lesson language menu within the vocabulary lesson for selecting another language of the plurality of languages for pronunciation of the one or more vocabulary words included in the vocabulary lesson; and
      after a predetermined period of silence, pronouncing the one or more vocabulary words in a selected language.

9. The non-transitory computer readable medium of claim 8, wherein presenting the story as a read along activity in one or more of the plurality of languages further comprises presenting text of the read along story in a first language of the plurality of languages and presenting audio of the read along story in a second language of the plurality of languages.

10. The non-transitory computer readable medium of claim 8, wherein presenting the story as a read along activity in one or more of the plurality of languages further comprises presenting one or more visual images corresponding to the story.

11. The non-transitory computer readable medium of claim 8, wherein presenting the story as a read along activity in one or more of the plurality of languages further comprises presenting animated page turning.

12. The non-transitory computer readable medium of claim 8, wherein the non-transitory medium is a digital video disc (DVD).

13. A method comprising:
   presenting on a display operatively connected to a computer readable medium a language menu system for selecting a language from a plurality of languages;
   presenting on the display an activity menu system containing selections comprising: a story and a vocabulary lesson;
   responsive to selection of the story, using the display and an audio device to present the story as a read along activity in one or more of the plurality of languages; and
   responsive to selection of the vocabulary lesson, using one or more of the display and the audio device to present:
      the vocabulary lesson in one or more of the plurality of languages; and
      at least one visual story image and at least one sentence;
      one or more vocabulary words corresponding to one or more of: the at least one story image and the at least one sentence;
      one or more vocabulary word images visually representing the one or more vocabulary words; and
      a vocabulary lesson language menu within the vocabulary lesson for selecting another language of the plurality of languages for pronunciation of the one or more vocabulary words included in the vocabulary lesson; and
      after a predetermined period of silence, pronouncing the one or more vocabulary words in a selected language.

14. The method of claim 13, wherein to present the story comprises presenting on the display text of the read along story in a first language of the plurality of languages and presenting though an audio device audio of the read along story in a second language of the plurality of languages.

15. The method of claim 13, wherein to present the story further comprises presenting on the display one or more visual images corresponding to the story.

16. The method of claim 13, wherein to present the story further comprises presenting on the display animated page turning.

17. The method of claim 13, wherein to present the story further comprises, responsive to user selection of the another language, pronouncing via the audio device the vocabulary word in the another language.

18. A non-transitory computer readable medium executable by a playback device to perform:
   presenting a language menu system for selecting a language from a plurality of languages;
   presenting an activity menu system containing selections comprising a vocabulary lesson; and
   responsive to selection of the vocabulary lesson:
      presenting the vocabulary lesson in one or more of the plurality of languages;
      displaying at least one visual story image and at least one sentence;

presenting one or more vocabulary words corresponding to one or more of: the at least one story image and the at least one sentence;

displaying one or more vocabulary word images visually representing the one or more vocabulary words;

presenting a vocabulary lesson language menu within the vocabulary lesson for selecting another language of the plurality of languages for pronunciation of the one or more vocabulary words included in the vocabulary lesson; and after a predetermined period of silence, pronouncing the one or more vocabulary words in a selected language.

\* \* \* \* \*